United States Patent [19]

Whewell

[11] 4,438,174

[45] Mar. 20, 1984

[54] POLYESTER ANTISTATIC LAMINATE MATERIALS

[76] Inventor: Bruce R. Whewell, 7 Singers Close, Henley-on-Thames, Oxfordshire, England

[21] Appl. No.: 377,783

[22] Filed: May 13, 1982

[30] Foreign Application Priority Data

Jul. 14, 1981 [GB] United Kingdom ................ 8121590

[51] Int. Cl.³ ............................................ B32B 7/00
[52] U.S. Cl. .................................... 428/247; 428/251; 428/255; 428/408; 428/428; 428/430; 428/480
[58] Field of Search ............... 428/247, 251, 255, 408, 428/426, 430, 480

[56] References Cited

U.S. PATENT DOCUMENTS 4,379,801  4/1983  Weaver ............................... 428/480

Primary Examiner—Marion McCamish
Attorney, Agent, or Firm—Shanley and Baker

[57] ABSTRACT

An anti-static laminate material comprising a glass-reinforced panel having an electrically conductive mesh disposed at or just below its operational surface. The mesh is positioned near enough to the surface to impart a predetermined surface conductivity to the panel. The panel surface can be smooth or can have a textured, non-slip anti-glare configuration.

9 Claims, 5 Drawing Figures

U.S. Patent  Mar. 20, 1984  4,438,174
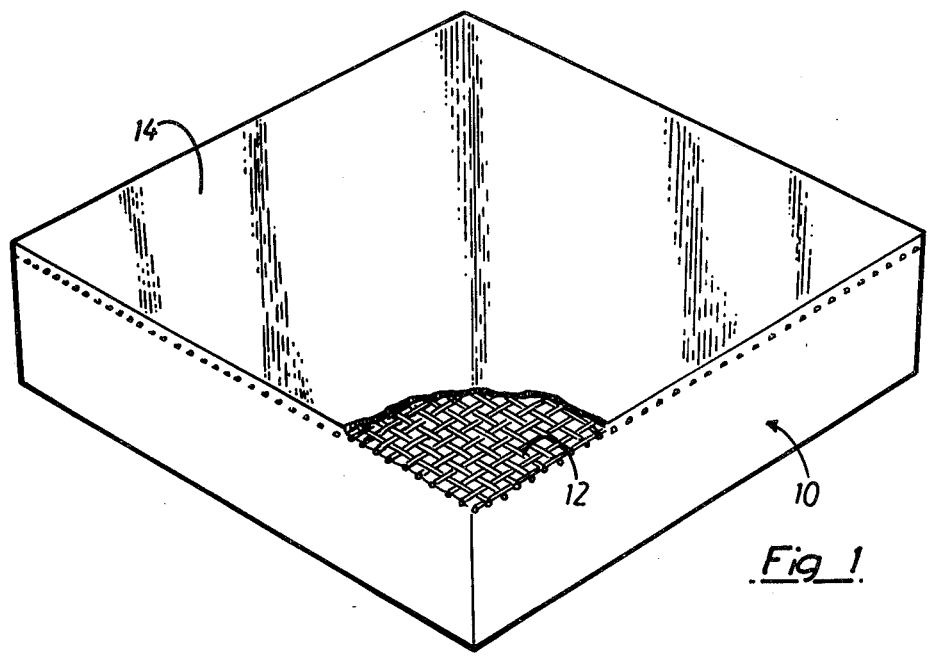
Fig_1
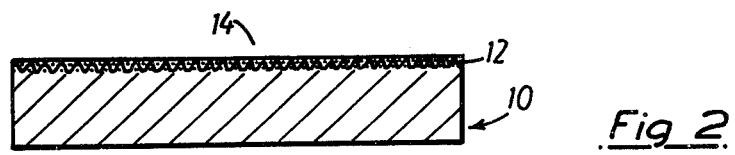
Fig_2
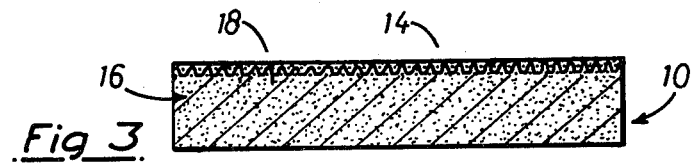
Fig_3
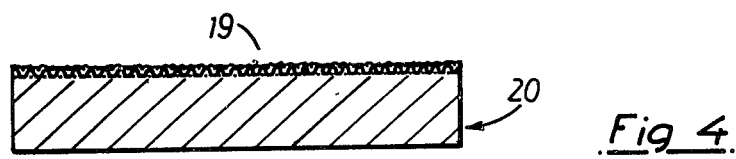
Fig_4
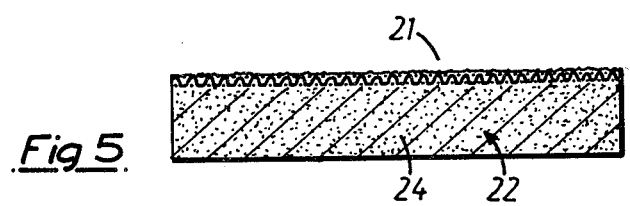
Fig_5

POLYESTER ANTISTATIC LAMINATE MATERIALS

The present invention is concerned with anti-static laminate materials of the type which are used primarily in the electronics industry as bench covering and floor covering materials to eliminate static build-up which otherwise could destroy voltage sensitive circuitry.

For the purpose of preventing such static build-up, the surface resistance of the material should lie in the range from approximately $10^3$ to $10^6$ ohms. per square. Conventional materials having this characteristic are produced by impregnating carbon into rubber and plastics. The latter products have, however, the disadvantage that they are difficult to bond onto the bench or floor and are not mechanically strong in service. Furthermore, they tend to stretch which results in a poor surface finish. Another important disadvantage is that, due to the heavy carbon loading required, the materials can only be produced in black which is a rather oppressive colour for operatives.

An object of the present invention is to produce anti-static laminate materials in which the aforegoing problems are mitigated.

In accordance with one aspect of the present invention, there is provided an anti-static laminate material comprising a glass-reinforced plastics (GRP) panel having an electrically conductive mesh disposed at or just below its operational surface.

The depth of penetration of the mesh is important in that it must be near enough to the surface to impart the necessary surface conductivity. In order to maintain adequate mechanical strength, however, the mesh must also be an integral part of the resin system.

Preferably, such a material is formed by providing a mesh having a predetermined electrical conductivity, introducing a thin layer of a polyester resin onto a flat mould, laying the conductive mesh on said resin layer, urging the mesh into said resin layer and then building up the thickness of the material by the application of one or more further layers of resin and/or conventional fibre-glass. When fully cured, the panel is removed from the mould, leaving a smooth anti-static surface on that face which was in contact with the mould.

The conductivity of the mesh must be carefully predetermined. When, for example, the mesh is constructed from glass cloth tissue, or other initially non-conducting material, impregnated with a dispersion of carbon (as used herein includes graphite) and allowed to cure, it is found that the conductivity of the mesh material will decrease by about two orders of magnitude when it is later introduced into the resin. Therefore it is necessary to produce a mesh that has 100 times the conductivity that is required of the finished product.

Other conductive mesh systems may also be used. For example, a thin carbon-fibre mesh can be used. In this case also, the conductivity of the mesh is degraded on insertion in the resin and must be allowed for in obtaining a required conductivity for the final product. In all cases it is important that the mesh be adequately "wetted out" by the resin so as to form an integral part of the finished laminate.

The polyester resin is of a chosen colour and is spread onto a waxed flat mould of required dimensions. The conductive mesh is laid onto this layer of resin and the resin is preferably forced through the mesh by the application of pressure thereto, such as by a grooved roller.

As an alternative to a smooth surface finish, it is sometimes desirable for the working surface of the final product to have a non-slip, anti-glare texture or configuration. These materials are produced in the same manner as the smooth laminates, but are moulded in a special mould having a textured or non-flat surface.

Additional factors must be considered, however, in the case of products having such textured finishes. As explained above, the present material is required to have a conductive mesh at or just below the surface of the laminate. For this reason, it is not possible to apply a so-called "gel-coat" as in conventional fibre-glass moulding techniques as this would insulate the surface. Such gel-coats are used in conventional techniques to eliminate surface imperfections such as air-bubbles and are usually formed using a thicker resin which, being thixotropic, covers the mould evenly without running. This forms the smooth shiny exterior surface of the finished product and is therefore applied first to the mould. Normally it is allowed to cure before applying subsequent resin and glassfibre backing layers.

In order to prevent the formation of surface imperfections in the present technique, particularly in the case of the textured finish versions, it has been found advantageous to incorporate in the resin a means for reducing the surface tension of the resin, such as a silicone material. This therefore acts as an antibubble agent.

In other embodiments, it has been found to be advantageous to impart to the backing layers, i.e. those applied after the conductive mesh has been inserted, a degree of electrical conductivity also. This can be achieved by incorporating electrically conductive particulate material in controlled quantities in the fibreglass resin used to build up such layers. For example, such particles could be carbon particles, preferably at a level of the order of 25 to 30 percent by weight.

In another embodiment, the electrically conductive particulate material could be in the form of cut carbon fibres (for example, approximately ½ mm in length) dispersed into the resin in controlled quantities (for example approximately 1% by weight). This has the advantage of imparting anti-static properties to the resin whilst not changing the colour significantly.

Materials constructed as above can have the following advantages:

(1) They are mechanically stronger than conventional anti-static materials.

(2) They are resistant to solder and chemicals.

(3) A semi-rigid laminate results which can be bonded easily onto the surface of a bench.

(4) The material has a smooth surface that is easy to clean.

(5) It can be made in a variety of colours.

The invention is described further hereinafter, by way of example only, with reference to the accompanying drawings, in which:

FIG. 1 is a highly diagrammatic, perspective view of one embodiment of a laminate material in accordance with the present invention;

FIG. 2 is a highly diagrammatic side view of the material of FIG. 1;

FIG. 3 is a highly diagrammatic side view of a further embodiment of a material in accordance with the invention;

FIG. 4 is a highly diagrammatic side view of another embodiment of a material in accordance with the invention; and FIG. 5 is a highly diagrammatic side view of yet another embodiment of a material in accordance with the invention.

The material of FIGS. 1 and 2 comprises a flat panel 10 of basically electrical non-conductive glass-reinforced plastics material having a mesh 12 of electrically conductive material disposed at or immediately below its flat coating surface 14. The thickness of the panel 10 is selected to suit requirements by building up layers of GRP in a mould.

In the embodiment of FIG. 3, the material from which the backing 16 is formed itself has electrically conductive particulate material 18, e.g. carbon, embedded therein so that the backing 16 also has a predetermined conductivity.

FIG. 4 shows an embodiment having a textured surface finish 19 but wherein the majority of the backing layer 20 is electrically insulating.

FIG. 5 shows an embodiment having a textured surface finish 21 and where the backing layer 22 has electrically conductive particles 24 incorporated therewithin.

I claim:

1. An anti-static laminate material comprising
   a thin polyester resin layer,
   an electrically conductive mesh disposed within said resin layer at or immediately below its operationally upper surface,
   said electrically conductive mesh being selected from the group consisting of glass cloth tissue, impregnated with a dispersion of carbon particles, and thin carbon-fibre mesh, and
   one or more backing layers of polyester resin and/or conventional fibre-glass.

2. The anti-static laminate material of claim 1 wherein said operationally upper surface of the laminate material has a textured finish.

3. The anti-static laminate material of claim 1 wherein said backing layer portion of said laminate material contains electrically conductive particulate material.

4. The anti-static laminate material of claim 1 wherein said electrically conductive particulate material comprises carbon particles in the proportion of about 25% to 30% by weight of said further backing portion.

5. The anti-static laminate material of claim 1 wherein said electrically conductive particulate material comprises carbon fibres of about 0.5 mm length in the proportion of about 1% by weight of said further backing portion.

6. A process for the manufacture of an anti-static laminate material comprising the steps of
   introducing a thin layer of a polyester resin into a mould covering a surface thereof;
   providing an electrically conductive mesh selected from the group consisting of glass cloth tissue, impregnated with a dispersion of carbon particles, and thin carbon-fibre mesh;
   laying such electrically conductive mesh on said resin layer;
   urging said electrically conductive mesh into said resin layer so as to be disposed at or immediately below its mould contact surface which comprises the operationally upper surface of the anti-static material, and
   building up the thickness of the anti-static laminate material by the application of one or more backing layers of polyester resin and/or conventional fibreglass.

7. The process of claim 6 wherein said one or more backing layers contains carbon particles in the proportion of about 25% to 30% by weight.

8. The process of claim 6 wherein said one or more backing layers contain carbon fibres of about 0.5 mm length in the proportion of about 1% by weight.

9. The process of claim 1 wherein such mould surface is textured resulting in moulded laminate material having a textured upper surface.

* * * * *